(12) United States Patent
Hyon et al.

(10) Patent No.: US 7,881,277 B2
(45) Date of Patent: Feb. 1, 2011

(54) COMMUNICATION METHOD AND APPARATUS FOR DISTRIBUTED NETWORK SYSTEM WHERE COGNITIVE RADIO TECHNOLOGY IS APPLIED

(75) Inventors: Tae In Hyon, Hwaseongsi (KR); Jae Myoung Kim, Seoul (KR); Jae Hak Chung, Seoul (KR); Sang Jo Yoo, Incheon (KR); Kyoung Jin Jo, Incheon (KR)

(73) Assignees: Samsung Electronics Co., Ltd., Suwon-si (KR); INHA-Industry Partnership Institute, Incheon (KR)

( * ) Notice: Subject to any disclaimer, the term of this patent is extended or adjusted under 35 U.S.C. 154(b) by 705 days.

(21) Appl. No.: 11/865,910

(22) Filed: Oct. 2, 2007

(65) Prior Publication Data
US 2008/0171552 A1 Jul. 17, 2008

(30) Foreign Application Priority Data
Jan. 11, 2007 (KR) .................... 10-2007-0003473

(51) Int. Cl.
*H04B 7/212* (2006.01)
*H04B 1/00* (2006.01)
*H04J 3/16* (2006.01)
*H04L 12/43* (2006.01)

(52) U.S. Cl. .................... 370/348; 370/437; 370/461; 455/63.1

(58) Field of Classification Search ......... 370/310–350, 370/437, 445–462; 455/63.1, 63.2, 450–453, 455/509
See application file for complete search history.

(56) References Cited

U.S. PATENT DOCUMENTS

| | | | | |
|---|---|---|---|---|
| 5,862,487 | A * | 1/1999 | Fujii et al. | 455/454 |
| 7,336,930 | B2 * | 2/2008 | Larsson et al. | 455/63.1 |
| 7,616,655 | B2 * | 11/2009 | Benveniste | 370/447 |
| 7,646,758 | B2 * | 1/2010 | Benveniste | 370/348 |
| 2005/0058151 | A1 * | 3/2005 | Yeh | 370/445 |
| 2007/0002814 | A1 * | 1/2007 | Benveniste | 370/338 |
| 2008/0014880 | A1 * | 1/2008 | Hyon et al. | 455/161.1 |
| 2008/0259811 | A1 * | 10/2008 | Cordeiro et al. | 370/252 |

* cited by examiner

*Primary Examiner*—Tri H Phan
(74) *Attorney, Agent, or Firm*—NSIP Law

(57) ABSTRACT

A communication method and apparatus for a distributed network system where a cognitive radio (CR) technology is used. A communication method of a distributed network system where the CR technology is used includes transmitting adjacent channel information, from at least one first neighbor node adjacent to a source node, first adjacent channel information of the at least one first neighbor node using a pulse signal according to a request of the source node; by transmitting, from at least one second neighbor node adjacent to a destination node, second adjacent channel information of the at least one second neighbor node to the destination node using a pulse signal according to a request of the destination node; and exchanging data between the source node and the destination node using a channel that is not currently used, according to the transmitted adjacent channel information.

33 Claims, 7 Drawing Sheets

FIG. 6A

| CHANNEL | INCUMBENT SYSTEM | AVERAGE UTILIZATION |
|---|---|---|
| SC1 | X | 20% |
| SC2 | X | 50% |
| SC3 | O | 10% |

<LOCAL CST>

FIG. 6B

| NEIGHBOR NODE | NOT AVAILABLE CHANNEL |
|---|---|
| N1 | SC1, SC3 |
| N2 | SC4 |
| N3 | SC5 |

<NEIGHBOR CST>

COMMUNICATION METHOD AND APPARATUS FOR DISTRIBUTED NETWORK SYSTEM WHERE COGNITIVE RADIO TECHNOLOGY IS APPLIED

CROSS-REFERENCE TO RELATED APPLICATIONS

This application claims the benefit of Korean Patent Application No. 2007-3473, filed in the Korean Intellectual Property Office Jan. 11, 2007, the disclosure of which is incorporated herein by reference.

BACKGROUND OF THE INVENTION

1. Field of the Invention

Aspects of the present invention relate to a cognitive radio (CR) system. More particularly, aspects of the invention relate to a communication method and apparatus for a distributed network system where CR technology is used.

2. Description of the Related Art

Due to the rapid development of wireless communication technologies, wireless communication systems are currently required to obtain and maintain their own frequency band to overcome disadvantages of coexistence of systems. However, frequency resources for new wireless communication systems are virtually exhausted, since most frequency bands currently available are already assigned according to government policy. Frequency bands are almost all in use, and thus there are no additional frequency bands that may be used.

Cognitive radio (CR) technology is one of the technologies currently being discussed to overcome radio resource shortages. In CR technology, radio resources with a low utilization ratio are identified and frequency radio resources are shared without interfering with systems currently using assigned frequencies. Accordingly, radio resource efficiencies are theoretically expected to improve.

Economic efficiency is one of the advantages of CR technologies. Compared to existing wireless communication services, CR technologies are relatively low priced as wireless frequency bands are used at no charge. CR technologies are also related to the management and distribution of wireless channels with respect to multi-channels and to interference detection technologies that can be used together with next generation wireless communication. For example, CR technologies may efficiently transmit high speed data in dead zones without generating interference. The dead zones are created in cellular environments or rural areas required to improve cell sizes. However, CR technology is in an early stage of the standardization and development process. Accordingly, most technological details of the CR technology has not been determined yet; thus, there are disadvantages to overcome.

To apply communication systems using the CR technology to distributed network environments, each node needs to know whether frequencies are used by an authorized communication provider. Distributed network environments include a mobile ad hoc network (MANET), a wireless local area network (WLAN), and the like. The MANET is a network where mobile terminals can communicate with each other without a fixed infrastructure and is referred to as an infrastructureless network. Unauthorized nodes using the CR technology should use another channel when the nodes determine that an authorized communication provider is currently using the channel. Conventional communication systems are strictly controlled by governments, and thus disadvantages within a given frequency band are considered. However, wireless communication systems using the CR technology avoid incumbent users, that is, authorized communication systems, and sense available channels. Accordingly, a technology that can efficiently report incumbent users with the CR technology is needed.

FIG. 1 is a diagram illustrating an example of a communication environment of a general distributed network system. For example, a MANET is described as the distributed network system. A narrow circle or a circular line around an incumbent user indicates an incumbent system interference area of the incumbent user.

A source node refers to a communication device including data that is transmitted via a wireless interface based on the CR technology. A destination node refers to a communication device that finally receives the data via the wireless interface based on the CR technology. A neighbor node refers to a communication device located at a distance of a single hop from the source node and the destination node. A channel status table (CST) refers to a set of data indicating the status of each channel. The incumbent user refers to a wireless communication system having a legal right to use a frequency. A node using a particular channel using the CR technology needs to change a channel when an incumbent user is using the same channel as the node. A term such as an incumbent system or a user/terminal of the incumbent system may be used instead of incumbent user.

As illustrated in FIG. 1, in the MANET, various unauthorized nodes 100, 101, 102, 110, 111, and 112 can exist in a single space. When packet data is transmitted from a source node 110, i.e., a start point (S), to a destination node (D) 100 via a sub-channel 1 (SC1) in operation S120, the neighbor nodes 101, 102, 111, and 112 can overhear the transmission of the packet data. This overhearing is referred to as listening. When the incumbent user uses a channel 1 (SC1) 150, a channel 2 (SC2) 151, a channel 3 (SC3) 152, and a channel (SC4) 153, respectively, an incumbent user 141 using the SC1 suffers serious interference due to the data transmission of the unauthorized nodes 100 and 110. The unauthorized node 112 sensing a signal of the incumbent user 141 cannot provide information about the interference to the source node 110. Accordingly, the unauthorized node 112 can interfere with the incumbent user 141.

A communication range of an incumbent user 140 using the SC3 reaches the destination node 100. The destination node 100 therefore does not use the SC3 as a data channel, since the destination node 100 recognizes that the SC3 is being used. However, communication ranges of the incumbent users 141, 142, 143, 144, and 145 using the SC1, the SC2, and the SC4 do not reach the source node 110 or the destination node 100. Accordingly, a node transmitting random data cannot ascertain whether the SC3 is being used by an incumbent user. Thus, when the node selects and uses any one of the SC1, the SC2, and the SC4 as the data channel, the incumbent users can be adversely affected by, for example, an interference phenomenon. This problem is referred to as a problem of a hidden incumbent system.

Specifically, a communication method and apparatus of the distributed network system where the CR technology is used in the conventional art has several disadvantages. First, nodes using a same frequency exist in the distributed network system where the CR technology is used, since the disadvantage of the hidden incumbent system cannot be overcome. Accordingly, communication interference deteriorates and a high quality communication may not be guaranteed. Second, the CST cannot be actively updated in the distributed network system where the CR technology is used. Accordingly, an available channel can not be rapidly retrieved.

Thus, a new communication method and apparatus for a distributed network system where CR technology is used is needed.

SUMMARY OF THE INVENTION

Aspects of the present invention provide a communication method and apparatus for a distributed network system where CR technology is used which can overcome a disadvantage of a hidden incumbent system and to enable nodes to communicate with each other without interference.

Aspects of the present invention also provide a communication method and apparatus for a distributed network system where CR technology is used that can actively update a channel status table (CST) and can reduce a size of the CST and select a channel more rapidly and accurately.

According to an aspect of the present invention, there is provided a communication method of a distributed network system where cognitive radio (CR) technology is used, the communication method including: transmitting, from at least one first neighbor node adjacent to a source node, first adjacent channel information of the at least one neighbor node using a pulse signal according to a request of the source node; transmitting, from at least one second neighbor node adjacent to a destination node, second adjacent channel information of the at least one second neighbor node to the destination node, using a pulse signal according to a request of the destination node; and exchanging data between the source node and the destination node using a channel that is not currently used, according to the transmitted adjacent channel information.

According to another aspect of the present invention, a communication apparatus of a distributed network system in CR technology is provided, the communication apparatus including: a source node to receive, from at least one first neighbor node adjacent to the source node, first adjacent channel information of the at least one first neighbor node, the first adjacent channel information of the at least one first neighbor node being specified using a pulse signal; and a destination node to receive, from at least one second neighbor node adjacent to the destination node, second adjacent channel information of the at least one second neighbor node, the adjacent channel information of the at least one neighbor node being specified using the pulse signal; wherein the source node uses a channel not currently used, as a data channel to exchange data between the source node and the destination node according to the transmitted first and/or second adjacent channel information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6A illustrates an example of an active channel status table (CST) of a distributed network system where CR technology is used according to an embodiment of the present invention;

FIG. 6B illustrates another example of an active CST of a distributed network system where CR technology is used according to an embodiment of the present invention;

DETAILED DESCRIPTION OF THE EMBODIMENTS

Figure 1:
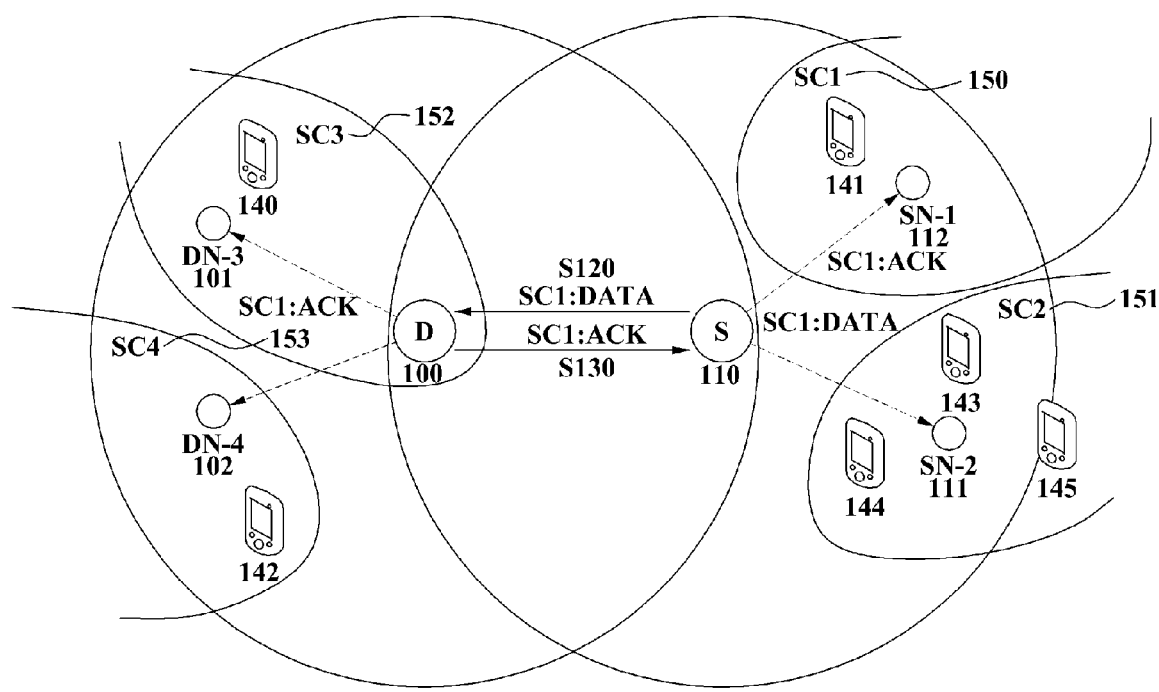
FIG. 1 illustrates an example of a communication environment of a general distributed network system in a conventional art.

Reference will now be made in detail to present embodiments of the present invention, examples of which are illustrated in the accompanying drawings, wherein like reference numerals refer to the like elements throughout. The embodiments are described below in order to explain the present invention by referring to the figures.

Figure 2:
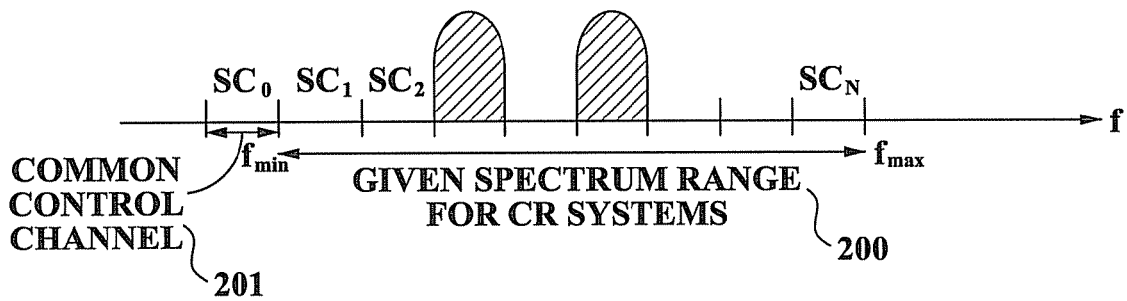
FIG. 2 illustrates an example of allocating a channel of a distributed network system where cognitive radio (CR) technology is used according to an embodiment of the present invention.

FIG. 2 is a diagram illustrating an example of a technique of allocating a channel of a distributed network system where cognitive radio (CR) technology is used according to an embodiment of the present invention. Limited frequency bands 200 and 201 are divided into a plurality of virtual sub-channels $SC_0$ through $SC_N$. The divided sub-channel $SC_0$ is a control channel 201 and a common frequency band that the incumbent user does not use. The virtual sub-channels $SC_1$ through $SC_N$ 200 are frequency bands that the incumbent user can use. A single data channel is actively selected from the virtual sub-channels $SC_1$ through $SC_N$ through a frequency band sensing result of each node and an available frequency band selection process using the control channel 201. The single data channel does not affect the incumbent user.

Figure 3:
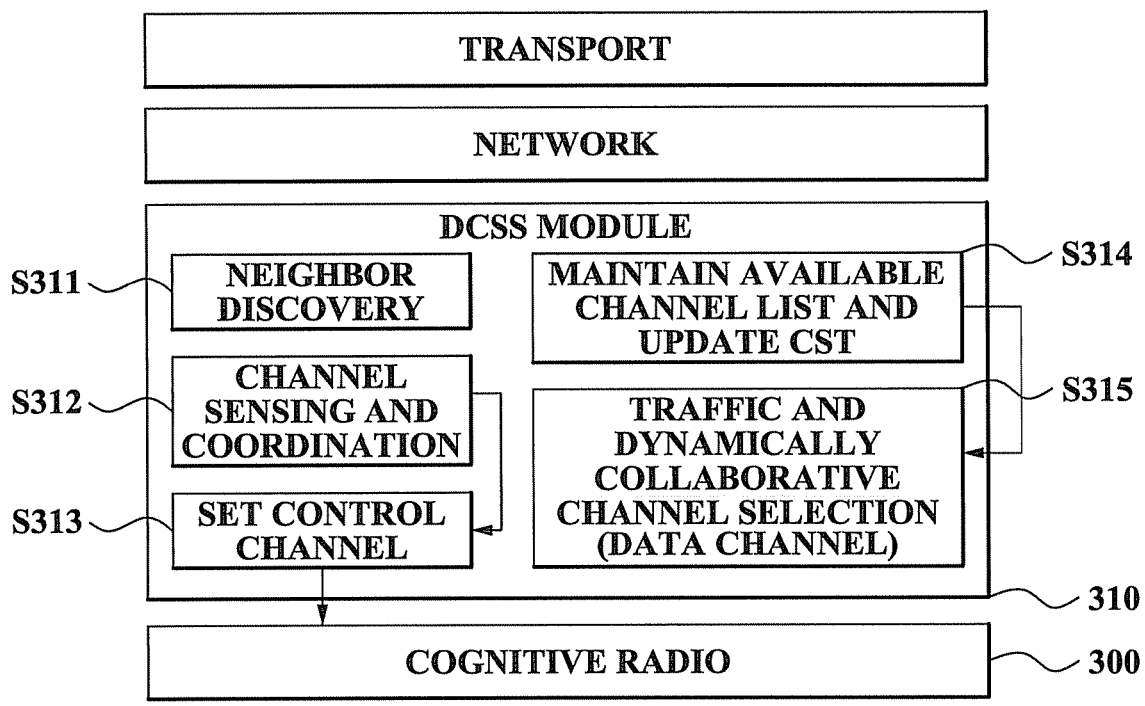
FIG. 3 illustrates a configuration of a distributed network system where CR technology is used according to an embodiment of the present invention.

FIG. 3 is a block diagram illustrating a configuration of a distributed network system where CR technology is used according to an embodiment of the present invention. A distributed coordinated spectrum sharing (DCSS) module of a medium access control (MAC) layer 310 is described in detail. The MAC layer 310 is a data link layer of an MANET or other distributed network. Operations S311, S312, S313, S314, and S315 can be performed in a detailed module of the DCSS module or embodied in a separate chip. In distributed spectrum sharing according to an embodiment of the present invention, a source node or a destination node discovers a neighbor node in operation S311. As a result of discovering the neighbor node in operation S312, a control channel is set in operation S313. In operation S314, an available channel list is maintained using a request-to-send (RTS) message, a channel-report-slots-to-source (CHRPT-S) message, a channel-request (CHREQ) message, and a channel-report-slots-to-destination (CHRPT-D) message. A channel status table (CST) of each node is actively updated. The actively updated CST is referred to as an active CST to differentiate the active CST from a fixed CST used in the conventional art. However, the present invention is not limited due to the term "active CST". In operation S315, a data channel is determined based on the updated active CST and various data is transmitted. The RTS message, the CHRPT-S message, the CHREQ message, and the CHRPT-D message are described in detail with reference to FIG. 4.

Figure 4:
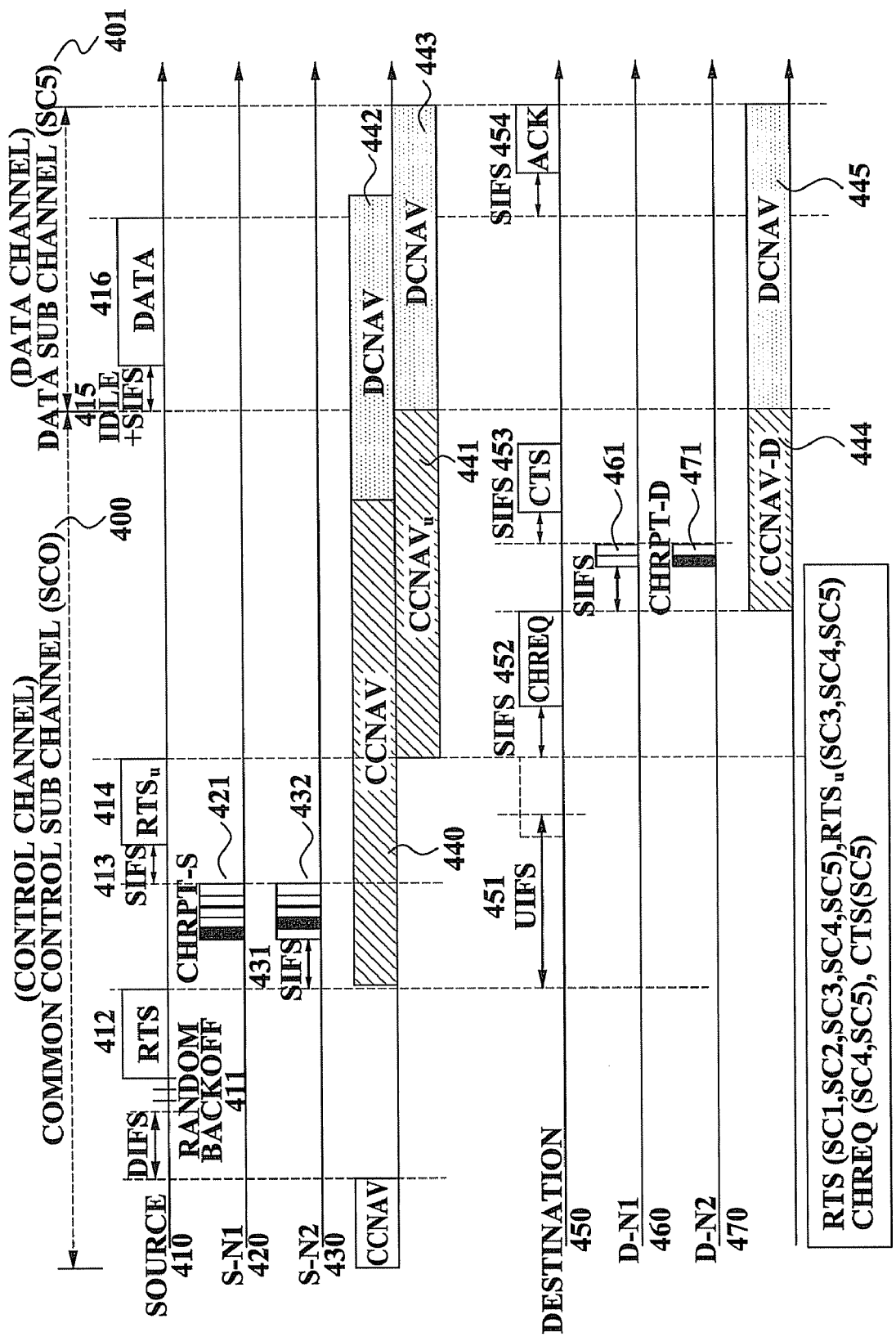
FIG. 4 illustrates a communication technique of a distributed network system where CR technology is used according to an embodiment of the present invention.

FIG. 4 is a diagram illustrating a communication method of a distributed network system where CR technology is used according to an embodiment of the present invention. The RTS message refers to a message transmitted by a source node prior to transmitting a frame in order to prevent wireless devices from colliding. The RTS message may include an available sub-channel list that the source node can use. An RTSu message includes a newly updated sub-channel list. Unavailable sub-channels are omitted from the newly updated sub-channel list based on the CHRPT-S message received from a neighbor node of the source node after the source node transmits the RTS message.

The CHRPT-S message refers to a message including a pulse signal in a slot corresponding to an unavailable channel in a sub-channel list of the RTS message, after the neighbor node of the source node receives the RTS message and determines an adjacent channel status. The CHRPT-S message is referred to as a channel report slot. The CHREQ message refers to a message where a destination node requests a neighbor node of the destination node for adjacent channel information. The CHREQ message includes a sub-channel list that the destination node can use, based on the available sub-channel list received from the source node. The CHRPT-D message refers to a message including the pulse signal in a slot corresponding to an unavailable channel in a sub-channel list of the CHREQ message, after the neighbor node of the destination node receives the CHREQ message and determines the adjacent channel status. The CHRPT-D message is referred to as the channel report slot. The source node, destination node, and neighbor nodes can be any type of device capable of wireless communication, such as a desktop computer, a server, a portable computer, a mobile phone, a personal digital assistant, or a personal entertainment device.

A clear-to-send (CTS) message includes information about a finally available channel and is transmitted by the destination node. A short interframe space (SIFS) refers to a shortest waiting period and is used with the RTS message, the CTS message, a DATA message, and an acknowledge (ACK) message. A distributed interframe space (DIFS) refers to a waiting period from a time when a transmission of a frame is successfully completed to a time when a subsequent frame is transmitted. An update interframe space (UIFS) refers to a period of time for checking whether the source node transmits the RTSu message after the destination node receives a first RTS message of the source node. A control channel network allocating vector (CCNAV) provides information about a usage time of a control channel. Nodes other than the source node and the destination node do not attempt to transmit the frame until the control channel is determined to be 'idle' through a virtual detection process. A data channel network allocating vector (DCNAV) provides information about whether a data channel is used. When a collision between terminals occurs, a terminal sets a size of a competition window of the terminal to be large so as to reduce a possibility of collision; this procedure is referred to as a backoff procedure.

As illustrated in FIG. 4, a source node 410 that desires to transmit data transmits an RTS message 412 to a destination node 450 when a random backoff time 411 becomes '0' after the source node 410 stands by during the DIFS. The RTS message 412 includes an available channel list determined by the source node 410 and a media usage time that is virtually calculated. A CCNAV 440 and a DCNAV 442 are operated when the RTS message 412 is transmitted. Neighbor nodes 420 and 430 of the source node 410 listen to the RTS message 412 and report adjacent channel information to the source node 410 by including a pulse signal in a slot of CHRPT-S messages 421 and 432. Other signals may be supplied instead of the pulse signal.

The slot of the CHRPT-S messages 421 and 432 may correspond one-to-one to each channel. The number of the slot may be identical to the number of the channel. Accordingly, when the pulse signal is sensed in a random slot of the CHRPT-S messages 421 and 432, whether a channel corresponding to the sensed slot is used by an incumbent user is easily determined. The source node 410, which senses the pulse signal in the slot of the CHRPT-S messages 421 and 432, updates the CST of the source node 410. The active CST can actively report information about an adjacent channel status through the supplying of the pulse signal of a neighbor node. The source node 410 retransmits an RTSu message 414 to the destination node 450. The RTSu message 414 includes the updated active CST after an SIFS 413. When transmitting the RTSu message 414, a CCNAVu 441 and a DCNAV 443 are operated. The adjacent channel refers to a channel that interferes with the neighbor node, or may include the channel.

When receiving the RTSu message 414 from the source node 410 prior to a UIFS 451 after receiving the first RTS message 412, the destination node 450 transmits a CHREQ message 452 to neighbor nodes 460 and 470 of the destination node 450 by including a sub-channel list in the CHREQ message 452. A sub-channel that the destination node 450 cannot use is excluded from an available sub-channel list in the sub-channel list. The available sub-channel list is included in the RTSu message 414. The destination node 450 requests adjacent channel information from the neighbor nodes 460 and 470. A sub-channel that is not presently available is excluded and the available sub-channel list is transmitted. The time to retrieve the adjacent channel information in each neighbor node can thus be reduced. When the destination node 450 does not receive the RTSu message 414 until the UIFS 451 ends, the destination node 450 transmits the CHREQ message 452 to the neighbor nodes 460 and 470 of the destination node 450 based on the first RTS message 412, after an SIFS. The CHREQ message 452 also includes the media usage time virtually calculated, and thus a CCNAV-D 444 and a DCNAV 445 are operated.

The neighbor nodes 460 and 470, which receive the CHREQ message 452, are designed to enable the destination node 450 to determine the adjacent channel information by including the pulse signal in a slot of CHRPT-D messages 461 and 471. The slot of the CHRPT-D messages 461 and 471 corresponds one-to-one to the available channel, similar to the slot of the CHRPT-S messages 421 and 432. The destination node 450, which receives the pulse signal from the CHRPT-D messages 461 and 471, updates an active CST of the destination node 450. The destination node 450 selects an available channel that is not used by the incumbent user as a data channel. After the SIFS, the destination node 451 includes information about the determined data channel in a CTS message 453 and transmits the CTS message 453 to the source node 410. All signal exchanges of FIG. 4 are made in a control channel 400. Data transmitted by the source node 410 to the destination node 450 is transmitted via the determined data channel 401.

The CCNAV 440 and the DCNAV 442 include a value of an expected time when the control channel 400 and the data channel 401 are occupied by the source node 410 and the destination node 450, respectively. The neighbor nodes 420, 430, 460, and 470, which receive a message including the value, can check for a period of time when the source node 410 and the destination node 450 can use the control channel 400 and the data channel 401. As a result of the checking, the neighbor nodes 420, 430, 460, and 470 delay an access to the channel and may enter a sleep mode to save energy.

When the data channel 401 is selected by the destination node 450, the source node 410 transmits packet data via the data channel 401. When the transmission is successfully completed, the source node 410 receives an ACK message 454 from the destination node 450 and ends the communication process.

A method of differentiating the available channel from the unavailable channel by supplying the pulse signal to a random channel slot is described. Although the source node 410 reports that an SC1, an SC2, an SC3, an SC4, and an SC5 are available by transmitting the first RTS message 412, the neighbor node 420 transmits the CHRPT-S message 421 and includes the pulse signal in the first slot of the CHRPT-S message 421. Accordingly, the neighbor node 420 can thus report that the SC1 is unavailable. The neighbor node 430 transmits the CHRPT-S message 432 and includes the pulse signal in the second slot of the CHRPT-S message 432. The neighbor node 430 can report that the SC2 is unavailable. Thus, the source node 410 updates the active CST, transmits the RTSu message 414, and reports that the SC3, the SC4, and the SC5 are available.

The destination node 450 receives the first RTS message 412 from the source node 410 and waits for a receipt of the RTSu message 414 during the UIFS 451. In FIG. 4, it is assumed that the RTSu message 414 is received prior to the UIFS 451. The destination node 450, upon receiving the RTSu message 414, recognizes that the SC1 and the SC2 are unavailable based on the RTSu message 414. The destination node 450 recognizes that the SC3 is unavailable by referring to the active CST of the destination node 450. Accordingly, the destination node 450 transmits the CHREQ message 452 to the neighbor nodes 460 and 470 and requests a check of the SC4 and the SC5 only. The neighbor node 470, upon receiving the CHREQ message 452, transmits the CHRPT-D message 471 and includes the pulse signal in a slot of the CHRPT-D message 471. The neighbor node 470 reports that the SC4 is unavailable. Thus, the destination node 450 sets the SC5 as the data channel and transmits the CTS message 453 to the source node 410 and includes information about the set data channel in the CTS message 453.

Through operations described above, according to aspects of the present invention, a status of each channel can be easily and rapidly checked using the source node 410 and the destination node 450. The disadvantage of a hidden incumbent system can be overcome, and a channel can be selected more efficiently.

Figure 5:
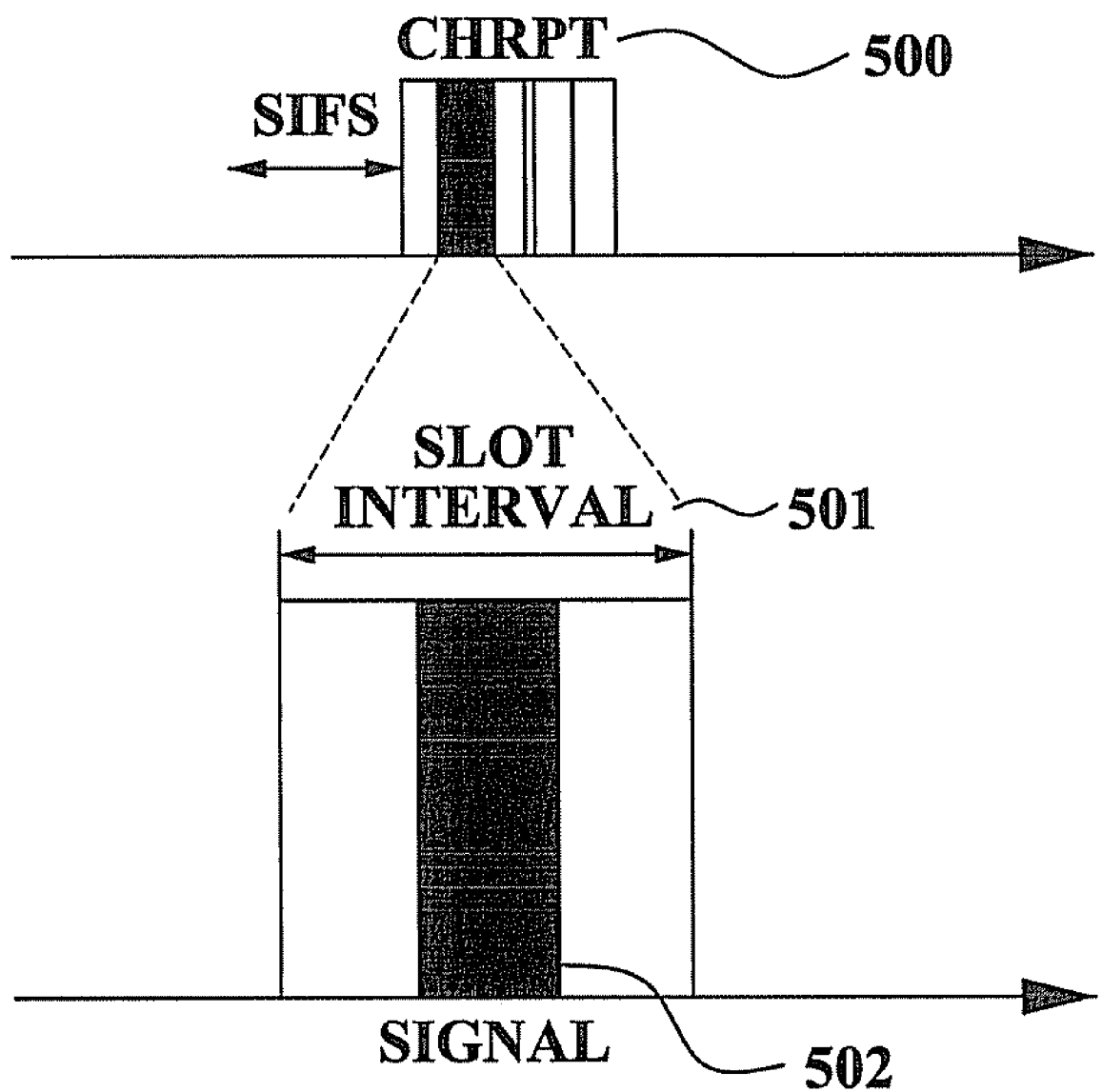
FIG. 5 illustrates an example of a channel report slot of a distributed network system where CR technology is used according to an embodiment of the present invention.

FIG. 5 is a diagram illustrating an example of a channel report slot of a distributed network system where CR technology is used according to an embodiment of the present invention. Even when each node included in a CR system is synchronized, a corresponding pulse signal may not be accurately supplied to a single slot. Accordingly, a slot interval 501 is designed to be approximately a k multiple of an interval of pulse signal 502. k may be a positive number or a fractional number. Supplying the pulse signal to an unintended slot or overlapping phenomenon can thus be prevented.

FIG. 6A is a diagram illustrating an example of an active CST of a distributed network system where CR technology is used according to an embodiment of the present invention. FIG. 6B is a diagram illustrating another example of an active CST of a distributed network system where CR technology is used according to an embodiment of the present invention. According to an embodiment of the present invention, a new CST management mechanism is provided for an efficient channel management. In the CST management mechanism, adjacent channel information is received from neighbor nodes in real time and the CST is actively updated. Various information is included in the CST to efficiently avoid an incumbent user in a CR system.

The local CST includes information about whether the incumbent user for each channel exists and information about an average channel utilization ratio, as illustrated in FIG. 6A. The neighbor CST includes information about an available channel and an unavailable channel as illustrated in FIG. 6B. The information about the available channel and the unavailable channel is acquired by a pulse signal and a message of adjacent nodes adjacent to a neighbor node. The information about the available channel and the unavailable channel is classified for each of the neighbor nodes.

Figure 7:
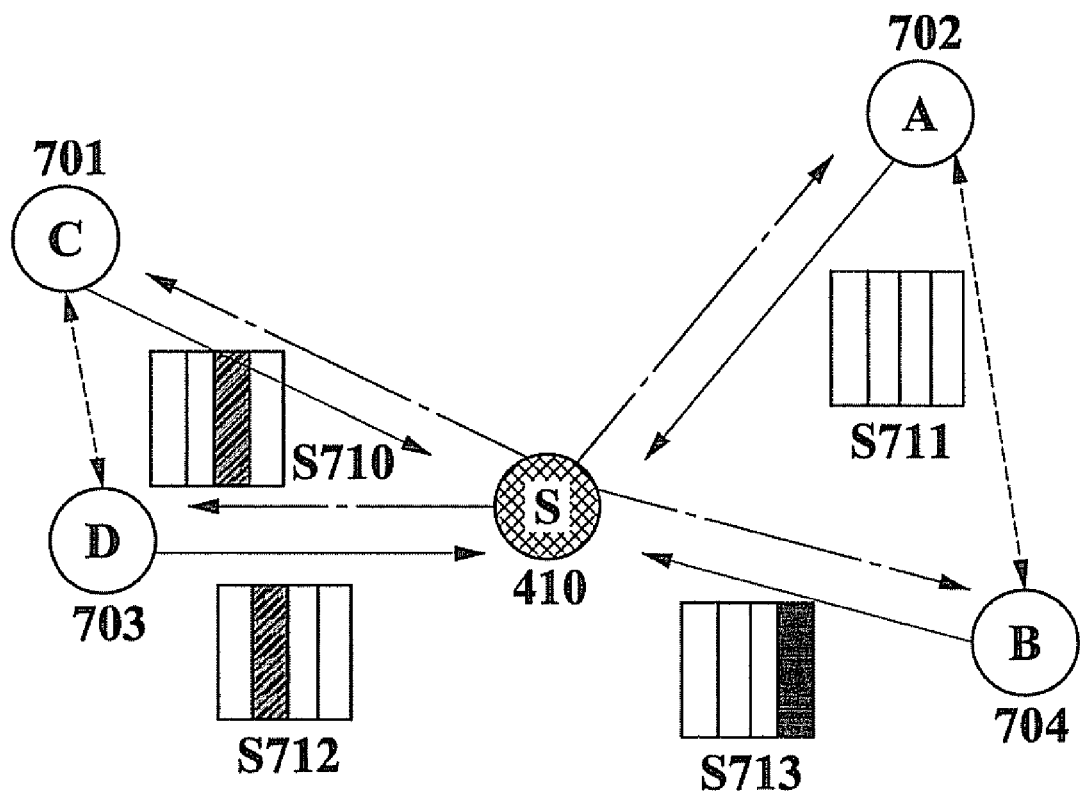
FIG. 7 illustrates a technique of updating an active CST of a distributed network system where CR technology is used according to an embodiment of the present invention.

FIG. 7 is a diagram illustrating a technique of updating the active CST of a distributed network system where CR technology is used according to an embodiment of the present invention. Neighbor nodes of the source node 410 and neighbor nodes of the destination node 450 can update an active CST of each of the neighbor nodes of the source node 410 and the neighbor nodes of the destination node 450 using an RTS message, a CTS message, a CHRPT-S message, a CHRPT-D message, and/or a CHREQ message. As illustrated in FIG. 7, it is assumed that the SC1, the SC2, the SC3, and the SC4 are all available when the source node 410 transmits a first RTS message to the destination node 450 (not illustrated). In operation S713, a node B 704 supplies a pulse signal to the fourth slot of the CHRPT-S message, thereby reporting to the source node 410 that the SC4 is unavailable. In operation S710, a node C 701 supplies the pulse signal to the third slot of the CHRPT-S message, thereby reporting to the source node 410 that the SC3 is unavailable. In operation S712, a node D 703 supplies the pulse signal to the second slot of the CHRPT-S message, thereby reporting to the source node 410 that the SC2 is unavailable. Accordingly, when transmitting an RTSu message to the destination node 450, the source node 410 can report that only the SC1 is available.

An operation where the node A 702 updates the active CST is as follows. Although the node A 702 is described as an example in the present specification, the node B 704, the node C 701, and the node D 703 can be applied in the same way as the node A 702. The node A 702 can also listen to the RTS message and the RTSu message that are transmitted by the source node 410 to the destination node 450. The node A 702 can listen to the CHRPT-S message transmitted by the node B 704 to the source node 410. Accordingly, the node A 702 can determine that the SC1, the SC2, the SC3, and the SC4 are available using the RTS message. The node A 702 can determine that the SC4 is unavailable by listening to the pulse signal supplied to a slot of the CHRPT-S message and can determine that the SC1 is available by listening to the RTSu message. Accordingly, the node A updates the active CST illustrated in FIGS. 6A and 6B. The active CST is actively updated and an available channel list is extracted more accurately. Thus, communication reliability can be improved and a size of the available channel list can be reduced.

Figure 8:
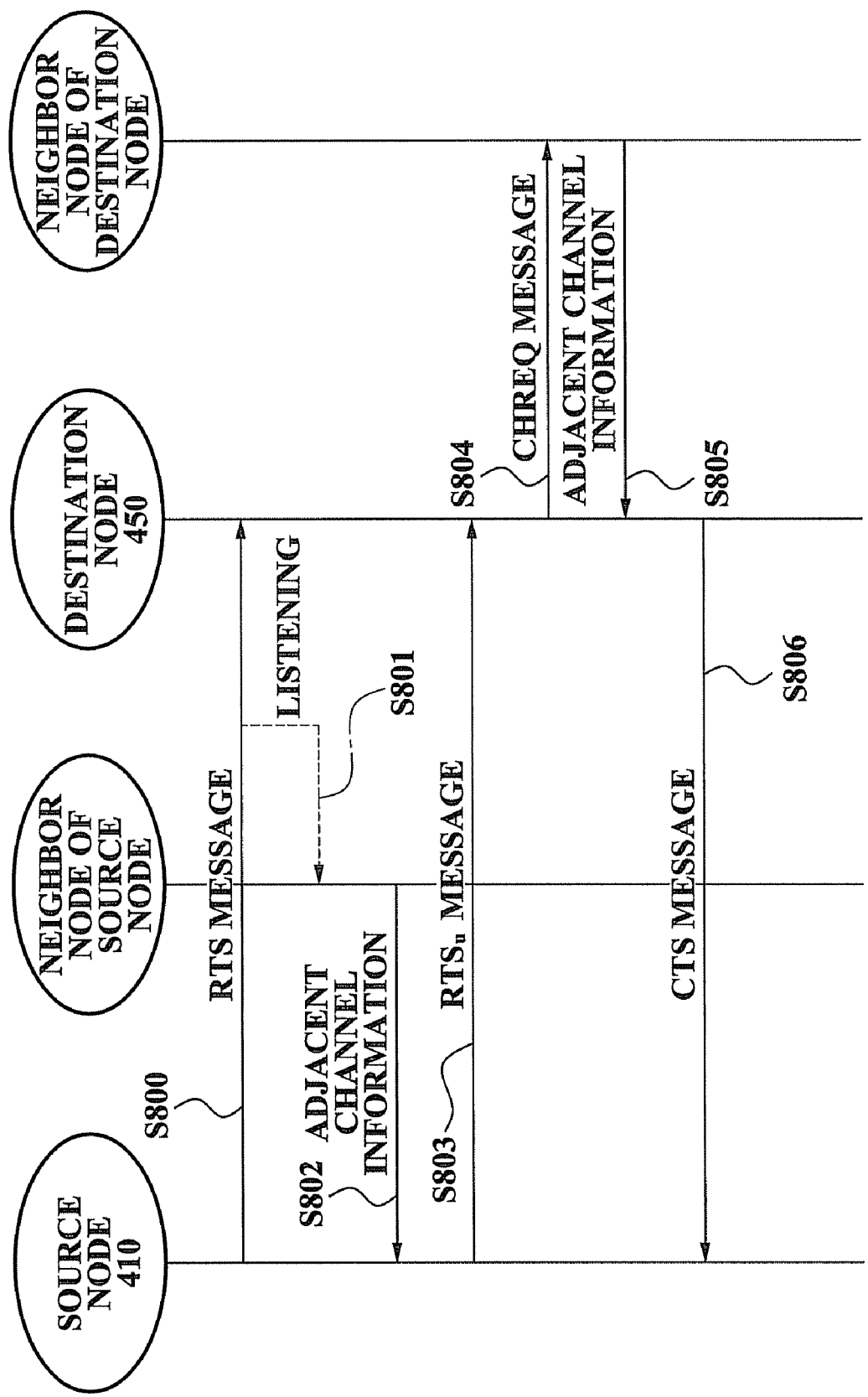
FIG. 8 illustrates a communication technique of a distributed network system where CR technology is used according to an embodiment of the present invention.

FIG. 8 is a diagram illustrating a communication method of a distributed network system where CR technology is used according to an embodiment of the present invention. In operation S800, the source node 410 transmits an RTS message to the destination node 450. A neighbor node of the source node 410 listens to the RTS message in operation S801 and reports adjacent channel information to the source node 450 in operation S802. The adjacent channel information is information for checking whether an incumbent user exists in a channel that interferes with the neighbor node. The neighbor node can be a single neighbor node or a plurality of neighbor nodes, such as neighbor nodes 420 and 430.

In operation S803, the source node 410 updates the active CST after receiving the adjacent channel information and transmits the RTSu message to the destination node 450, including the updated active CST in the RTSu message. In operation S804, the destination node 450 receiving the RTSu message transmits a CHREQ message to a neighbor node of the destination node 450. In operation S805, the neighbor node receiving the CHREQ message reports the adjacent channel information to the destination node 450. In operation S806, the destination node 450 transmits a CTS message to the source node 410 and includes information about a finally available channel in the CTS message. The source node 410 determines an available data channel by referring to the CTS message and transmits data to be transmitted using the determined data channel (not illustrated).

A communication method and apparatus of a distributed network system where CR technology is used can overcome a disadvantage of a hidden incumbent system and thereby remove a channel overlap phenomenon which is a serious disadvantage in CR technology. Particularly, the communication method and apparatus of a distributed network system where CR technology is used can be applied to a MANET more efficiently.

Also, a communication method and apparatus of a distributed network system where CR technology is used actively updates a CST and can detect an available channel more rapidly and accurately and reduce a size of the CST.

Wireless communication techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined by the claims and their equivalents.

What is claimed is:

1. A communication method of a distributed network system where cognitive radio (CR) technology is used, the communication method comprising:
    transmitting a request-to-send (RTS) message from a source node to a destination node, the RTS message being heard by at least one first neighbor node positioned adjacent to the source node;
    transmitting first adjacent channel information from the at least one first neighbor node to the source node via a pulse signal as a response to the heard RTS message;
    transmitting, from at least one second neighbor node positioned adjacent to the destination node, second adjacent channel information to the destination node using a pulse signal as a response to a request of the destination node; and
    exchanging data between the source node and the destination node, the data being exchanged over a channel that is selected by the destination node, according to the first and/or second adjacent channel information, as being available for the exchanging of data.

2. The communication method of claim 1, wherein the channel is divided into a control channel and at least one data channel.

3. The communication method of claim 2, wherein the first and/or second adjacent channel information is transmitted via the control channel.

4. The communication method of claim 1, wherein an adjacent channel, a status of which is provided through the transmission of the first and/or the second adjacent channel information, interferes with the at least one first and/or the at least one second neighbor nodes.

5. The communication method of claim 1, further comprising:
    configuring an active channel status table (CST) according to the first and/or second adjacent channel information.

6. The communication method of claim 5, wherein the active CST has a local CST including information about an average channel utilization ratio and information about whether an incumbent system for a plurality of channels exists, and a neighbor CST including information about an unavailable channel for each of the at least one first and/or the at least one second neighbor nodes.

7. The communication method of claim 1, wherein the transmitting of the first adjacent channel information comprises:
    updating an active channel status table (CST) based on the first adjacent channel information; and
    transmitting a request-to-send-update (RTSu) message from the source node to the destination node.

8. The communication method of claim 7, wherein the transmitting of the second adjacent channel information comprises requesting the second adjacent channel information to be transmitted from the at least one second neighbor node to the destination node.

9. The communication method of claim 7, wherein the updating of the active CST is in real time.

10. The communication method of claim 1, wherein the transmitting of the first adjacent channel information comprises:
    supplying the pulse signal of the first adjacent channel information to a slot corresponding to an unavailable channel,
    wherein a number of the slot corresponds one-to-one to a number of the unavailable channel.

11. The communication method of claim 10, wherein a size of the slot is designed to be a predetermined multiple of a time when the pulse signal of the first adjacent channel information is generated.

12. The communication method of claim 1, wherein the transmitting of the second adjacent channel information comprises:
    supplying the pulse signal of the second adjacent channel information to a slot corresponding to an unavailable channel, wherein a number of the slot corresponds one-to-one to a number of the unavailable channel.

13. The communication method of claim 12, wherein a size of the slot is designed to be a predetermined multiple of a time when the pulse signal of the second adjacent channel information is generated.

14. A communication apparatus of a distributed network system in a cognitive radio (CR) system, the communication apparatus comprising:
  a source node configured to:
    transmit a request-to-send (RTS) message to a destination node, the RTS message being heard by at least one first neighbor node positioned adjacent to the source node; and
    receive first adjacent channel information transmitted from the at least one first neighbor node via a pulse signal as a response to the RTS message,
  wherein the destination node is configured to transmit a request to at least one second neighbor node positioned adjacent to the destination node and receive second adjacent channel information transmitted from the at least one second neighbor node via a pulse signal as a response to the request, and
  wherein the source node and the destination node are configured to exchange data with each other over a channel selected by the destination node, according to the first and/or second adjacent channel information, as being available to exchange data.

15. The communication apparatus of claim 14, wherein the channel is divided into a control channel and at least one data channel.

16. The communication apparatus of claim 15, wherein the first and/or second adjacent channel information is transmitted and received via the control channel.

17. The communication apparatus of claim 14, wherein an adjacent channel, a status of which is provided by the first and/or second adjacent channel information, interferes with the at least one first and/or the at least one second neighbor nodes.

18. The communication apparatus according to claim 14, wherein the source node and the destination node are part of a MANET.

19. The communication apparatus of claim 14, wherein at least one of the source node and the destination node configures an active channel status table (CST) according to the first and/or second adjacent channel information.

20. The communication apparatus of claim 19, wherein the active CST comprises:
  a local CST including information about an average channel utilization ratio and information about whether an incumbent system for a plurality of channels exists; and
  a neighbor CST including information about an unavailable channel for each of the at least one first and/or the at least one second neighbor nodes.

21. A non-transitory computer readable medium comprising instructions that, when executed by a processor, cause the processor to perform a method comprising:
  transmitting a request-to-send (RTS) message from a source node to a destination node, the RTS message being heard by at least one neighbor node positioned adjacent to the source node;
  transmitting first adjacent channel information from the at least one first neighbor node to the source node as a response to the heard RTS message;
  transmitting, from at least one second neighbor node positioned adjacent to the destination node, second adjacent channel information to the destination node as a response to a request of the destination node; and
  exchanging data between the source node and the destination node, the data being exchanged over a channel that is selected by the destination node, according to the first and/or second adjacent channel information, as being available for the exchanging of data.

22. The non-transitory computer readable medium according to claim 21, wherein the method further comprises:
  configuring an active channel status table (CST) according to the first and/or second adjacent channel information.

23. The non-transitory computer readable medium according to claim 22, wherein the active CST comprises:
  a local CST including information about an average channel utilization ratio and information about whether an incumbent system for a plurality of channels exists; and
  a neighbor CST including information about an unavailable channel for each of the at least one first and/or the at least one second neighbor nodes.

24. The non-transitory computer readable medium according to claim 23, wherein the method further comprises:
  updating the active CST based on the first adjacent channel information.

25. The non-transitory computer readable medium according to claim 23, wherein the method further comprises:
  updating the active CST based on the second adjacent channel information.

26. The non-transitory computer readable medium according to claim 21, wherein the first adjacent channel information includes a pulse signal in a slot corresponding to an unavailable channel.

27. The non-transitory computer readable medium according to claim 21, wherein the second adjacent channel information includes a pulse signal in a slot corresponding to an unavailable channel.

28. A method of reducing interference in cognitive radio communication, the method comprising:
  transmitting a request-to-send (RTS) message to a destination node, the RTS message being heard by at least one neighbor node positioned adjacently;
  receiving first adjacent channel information indicating unavailable channels from the at least one neighbor node as a response to the heard RTS message;
  transmitting an updated request-to-send (RTSu) message to the destination node based on the first adjacent channel information if the first adjacent channel information indicates unavailable channels not indicated in the RTS message;
  receiving a clear-to-send (CTS) message from the destination node based on the RTS message or the RTSu message; and
  communicating with the destination node based on the CTS message.

29. The method of claim 28, further comprising updating a first channel status table (CST) based on the first adjacent channel information.

30. The method of claim 28, further comprising:
  receiving the request-to-send (RTS) message from a source node;
  transmitting a channel request message to at least one second neighbor node positioned adjacently;
  receiving second adjacent channel information indicating at least one unavailable channel from the at least one second neighbor node; and
  communicating with the source node based on the second adjacent channel information.

31. The method of claim 30, further comprising:
transmitting the clear-to-send (CTS) message to the source node containing information about an available channel.

32. The method of claim 30, further comprising:
updating a first channel status table (CST) based on the first adjacent channel information; and
updating a second CST based on the second adjacent channel information.

33. The method of claim 32, wherein the updating of the first CST and the second CST is in real time.

* * * * *